United States Patent
Hunn et al.

[11] 3,948,424
[45] Apr. 6, 1976

[54] FRONT RACK FOR MOTORCYCLE

[76] Inventors: John L. Hunn, 4108 N. Lake Drive; Todd M. Johnson, 2944 N. Frederick Ave., both of Milwaukee, Wis. 53211

[22] Filed: Feb. 24, 1975

[21] Appl. No.: 552,580

[52] U.S. Cl. .................. 224/41; 224/30 A; 224/36
[51] Int. Cl.² ............................................ B62J 7/00
[58] Field of Search.... 224/30 R, 30 A, 33 A, 33 R, 224/36, 37, 39 R, 41

[56] References Cited
UNITED STATES PATENTS
2,327,537   8/1943   Lyman ................................. 224/36

FOREIGN PATENTS OR APPLICATIONS
995,591   12/1951   France ............................ 224/30 R

*Primary Examiner*—Albert J. Makay
*Attorney, Agent, or Firm*—Arthur L. Morsell, Jr.

[57] ABSTRACT

A carrying rack is supported at the front of a motorcycle over the headlight by two front supporting arms which embrace the headlight therebelow, and have lower ends positioned to be secured by standard lower pinch bolts. Rear supporting arms partially encircle the motorcycle instruments and are attached adjacent the handlebars through the use of bolts present on the motorcycle. The supporting arms include interchangeable extensions to adapt the arms to various types and makes of motorcycles.

8 Claims, 7 Drawing Figures

U.S. Patent    April 6, 1976    3,948,424
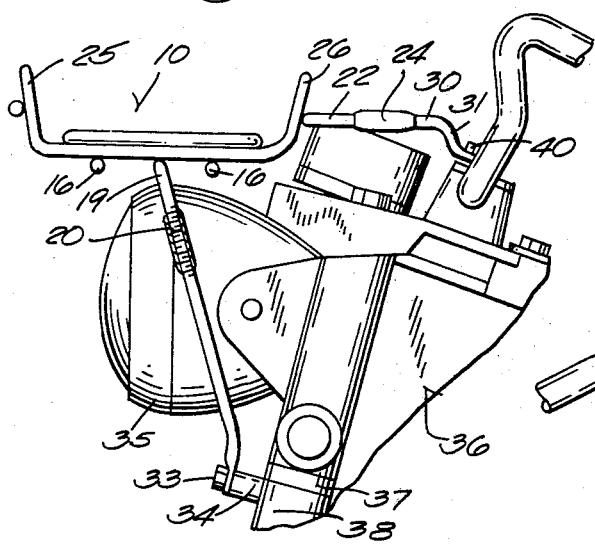
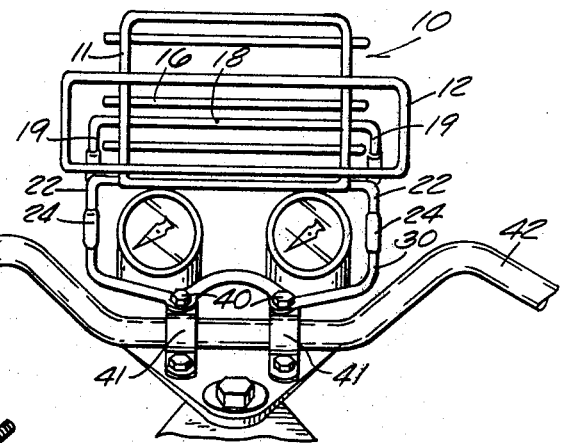
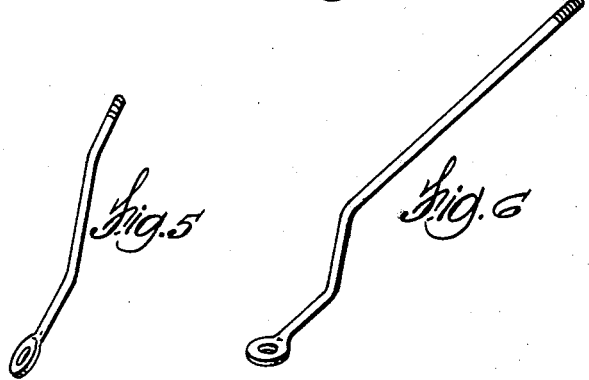
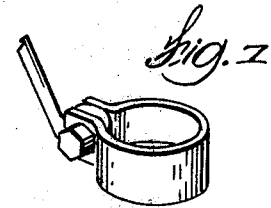
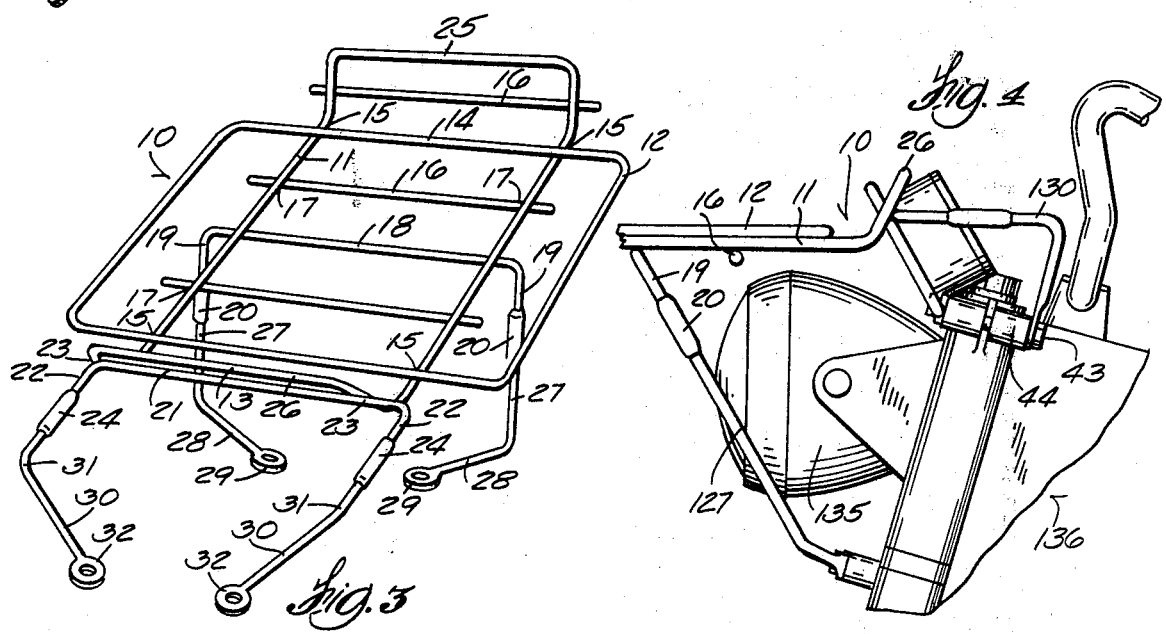

FRONT RACK FOR MOTORCYCLE

BACKGROUND OF THE INVENTION

In the past, carrying racks have been mounted on the rear of motorcycles. They have not been considered practical for the front because of the location of the headlight, speedometer, and other instruments.

SUMMARY OF THE INVENTION

In accordance with this invention, the foregoing difficulty is overcome by a novel construction and arrangement wherein the rack is positioned over the forward portion of the headlight to project a substantial distance forwardly therefrom, there being two supporting arms which embrace the headlamp and have lower ends positioned to be secured by bolts associated with standard pinch clamps on the motorcycle. Rear supporting arms partially encircle the motorcycle instruments and are attached adjacent the handlebars behind the instruments by the use of bolts present on the motorcycle. The supporting arms include the provision of interchangeable extensions to adapt the arms to various types, models and makes of motorcycles.

It is a general object of this invention to provide a rack which is firmly supported on the front portion of a motorcycle without interfering with the headlight, without obstructing the instruments, and without obstructing the driver's vision, and a rack which may be readily adapted to fit various types, models and makes of motorcycles.

DESCRIPTION OF THE DRAWINGS

FIG. 1 is a side elevational view in partial perspective, showing one preferred embodiment of the invention, with the rack used on one conventional make of motorcycle.

FIG. 2 is a perspective view looking principally from the top of the motorcycle of FIG. 1.

FIG. 3 is a perspective view of the rack and support arms of FIGS. 1 and 2 separated from the motorcycle.

FIG. 4 is a fragmentary side elevational view showing a modified type of installation, the forward portion of the rack being broken away.

FIGS. 5, 6 and 7 are perspective views showing interchangeable extension arms and connection devices.

DESCRIPTION OF THE PREFERRED EMBODIMENT

Referring to the drawing, the embodiment illustrated in FIGS. 1–3 includes a carrying portion 10 formed of two frames 11 and 12. The frame 11 is preferably formed from a single length of wire bent to the form shown and welded together as at 13 (FIG. 3). The frame 12 is also preferably formed of a length of wire bent to rectangular shape and welded together as at 14 (FIG. 3). As shown in FIG. 3, the frame 12 is superimposed on the frame 11 and welded thereto at locations 15. Thereafter transverse rods 16 are welded to the underside of frame 11 at locations 17 as shown. An additional rod 18 of greater length is positioned between the rods 16 and has its ends bent downwardly as at 19 to provide support elements. These ends are threaded to receive tubular coupling members 20 for a use to be hereinafter explained. The extensions 19 form upper portions of mounting arms. A U-shaped element 21 having extensions 22, interchangeable in size with the rod 18 and its extensions 19, is welded beneath the rear end of the frame 11 as at 23. The mounting extensions 22 are also threaded to receive coupling members 24 which are identical to the couplings 20. After the above has been completed, the forward end of the frame 11 is bent upwardly as at 25 and the rearward end is bent upwardly as at 26 until the mounting portions 22 are in a substantially horizontal position as shown in FIGS. 1 and 3. The above assembly comprises the basket or rack proper.

Various interchangeable extensions to provide mounting arms are provided in sets. As shown in FIGS. 1 and 3, there are extensions 27 having upper threaded ends which are threaded into the lower ends of the couplings 20. These extensions project angularly rearwardly as shown in FIG. 1 and the lower ends are bent inwardly as at 28 and are provided with bolt-receiving eyes 29. As shown in FIGS. 1 and 3, another set of extensions 30 is provided which have bends 31 therein and the upper ends of which are threaded into the lower ends of the couplers 24. The lower ends of the extensions 30 have bolt-receiving eyes 32. As will be hereinafter described, various kits are available for each rack, each kit including four extensions such as the extensions 27 and 30, four couplers such as the couplers 20 and 24, and in certain kits longer bolts such as the bolts 33 of FIG. 1 together with spacers 34. The equipment in each kit is sized, shaped and arranged to adapt the basket to a particular motorcycle.

The rod 18 with its downwardly-bent extensions together with the extensions 27–28 provide an inverted U-shaped portion which is spaced and positioned to embrace the headlight 35 of a motorcycle 36. It is to be noted that the lower end portions 28 of the extensions 27 are bent toward each other so that they are in a position to receive bolts 33 associated with the standard pinch clamps 37 on a motorcycle. Such pinch clamps are located on the lower Tee which supports the front fork 38. This Tee is located below the headlight 35. In the motorcycle illustrated in FIG. 1, it is necessary to use extra long bolts 33 and the spacers 34 in order to make suitable connection. On other motorcycles it may be entirely practical to have extension arms which fit the standard bolts and which do not need the spacers 34. The details of the connection may vary from one model to another, and it is contemplated that the kits furnish the proper equipment for the particular motorcycle.

The rear mupporting arms 20–30 are shaped to partially encircle motorcycle instruments such as 39, which are a speedometer and tachometer, respectively. The exact type of instrumentation may vary from model to model. The eyes 32 are adapted to receive bolts 40 (FIG. 2), which are a standard part of handlebar clamps 41, which are clamped to handlebars 42. These handlebar clamps are a standard part of many motorcycles. In other cases the extensions 30 may have a different type of bend to connect with upper pinch bolts 43 for clamps 44, as shown in the type of motorcycle illustrated in FIG. 4. This type of clamp usually secures the top of the fork tube of the motorcycle to the upper casting which connects with the handlebar assembly, as shown in FIG. 4. The exact connection may vary from model to model.

The upwardly-bent front portion 25 of frame 11 forms a front stop for luggage, and the upwardly-bent rear portion 26 forms a rear stop for luggage. It also forms a support for the bar 21 associated with the mounting arms.

Some of the extension arms may include a double bend such as shown in FIG. 5. Other bars may be much longer and include a double bend as shown in FIG. 6. In addition, alternate extension arms may be formed with an eye 29' (see FIG. 7) fitting between the ends of a ring clamp 45. This type of clamp may be used to encircle portions, such as the portion 38 of FIG. 1, on motorcycles where there is no pinch clamp of the type shown at 37. FIG. 4 shows additional interchangeable extensions at 127 and 131 to suit the different type of motorcycle 136 shown in FIG. 4, having a headlight 135. Only a few of the interchangeable mounting arm extensions have been illustrated. It is to be understood that a sufficient number of these will be made available so that the same rack portion can be made to fit many standard types, models and makes of motorcycles. The extensions 27, 31 and 127, 131, and those shown in FIGS. 5, 6 and 7, will differ in the following ways: the total length of the rod; the number of bends; the location of the bends; the angle of the bends; the direction of extent of the bolt-receiving eye; and the plane of the eye with respect to the extension rod.

To assemble the extensions on a particular basket, it is merely necessary to screw the couplers 20 on the bent portions 19 and to screw the extensions such as the extensions 27 into the lower ends of the couplers. Likewise, the couplers 24 are screwed onto the bent portions 22 and a set of extensions such as the extensions 30 is screwed into the outer ends of the couplers 24. The extensions are then rotated to bring them into a proper position to meet the connections such as those illustrated in FIGS. 1, 2 and 4.

In use, baskets, lunch boxes, back packs, duffel bags, or any other desired items, may be strapped in any convenient way to the basket portion by use of the frames 11 and 12 and the cross bars 16, 18, 25 and 26. It is to be noted that the basket portion, with its mounting parts 18–19 and 21–22, is standard and that the same basket with a suitable set of extensions can be made to fit many types, models and makes of motorcycles. It is to be noted that the basket, when mounted as shown in FIGS. 1 and 2, provides a very inexpensive and convenient rack which affords front carrying capacity without interfering with the headlight, with the rider's view of the instruments, or with the rider's view of the road.

The rack can be inexpensively manufactured from chrome-plated steel rods or from any other suitable material welded together at the juncture points.

Various changes and modifications may be made without departing from the spirit of the invention, and all of such changes are contemplated as may come within the scope of the claims.

What we claim is:

1. In combination with a motorcycle having a front steering assembly including a headlight, handlebars, and at least one instrument mounted above the headlight and forwardly of the handlebars, a front carrying rack having a substantially flat bottom portion positioned over the headlight, a pair of laterally-spaced, front supporting arms attached at spaced-apart locations to said bottom portion and extending downwardly and rearwardly therefrom and positioned and shaped to embrace said headlight to avoid obstructing the headlight beam, means connecting the lower ends of said front supporting arms to said steering assembly below said headlight, a pair of laterally-spaced rear supporting arms attached at spaced-apart locations to the rear of said rack and projecting rearwardly therefrom and positioned and shaped to partially encircle said instrument, and means for attaching the ends of said rear supporting arms adjacent said handlebars.

2. The combination of claim 1 wherein said front supporting arms are part of an inverted U-shaped frame portion, wherein the rear supporting arms are part of a U-shaped rear frame portion, and wherein the carrying rack is supported by said two U-shaped frame portions.

3. The combination as claimed in claim 1 in which the first supporting arms include laterally-spaced connecting portions projecting downwardly from the bottom portion of the rack, in which the rear supporting arms include laterally-spaced connecting portions projecting rearwardly from the rear of the rack, and in which there is coupling means interchangeably coupling selected ones of various extensions to said connecting portions to adapt the rack to a particular motorcycle.

4. The combination as claimed in claim 1 in which the rack includes a first longitudinally-extending rectangular frame, a second rectangular frame welded to the other to extend transversely thereof, and in which the first frame has upwardly-bent end portions to provide front and rear stops for the rack.

5. The combination as claimed in claim 4 in which the front supporting arms are connected to one of said frames intermediate the length thereof, and in which the rear supporting arms are connected to one of said upwardly-bent portions of the first frame to project rearwardly therefrom.

6. The combination as claimed in claim 1 in which the lower ends of the front supporting arms are connected to the front steering assembly by the bolts for the lower pinch clamps.

7. A combination as claimed in claim 1 in which the ends of the rear supporting arms are connected to the motorcycle by the bolts for the handlebar clamps.

8. A combination as claimed in claim 6 in which the ends of the rear supporting arms are connected to the motorcycle by the bolts for the handlebar clamps.

* * * * *